(12) United States Patent
Hansen (10) Patent No.: US 9,966,752 B2
(45) Date of Patent: May 8, 2018

(54) DEPLOYABLE CEILING BOX ASSEMBLY

(71) Applicant: FSR Inc., Woodland Park, NJ (US)

(72) Inventor: David R. Hansen, Garnerville, NY (US)

(73) Assignee: FSR, Inc., Woodland Park, NJ (US)

(*) Notice: Subject to any disclaimer, the term of this patent is extended or adjusted under 35 U.S.C. 154(b) by 0 days. days.

(21) Appl. No.: 15/155,938

(22) Filed: May 16, 2016

(65) Prior Publication Data
US 2017/0331269 A1     Nov. 16, 2017

(51) Int. Cl.
| | |
|---|---|
| *H02G 15/06* | (2006.01) |
| *A47B 46/00* | (2006.01) |
| *A47B 47/00* | (2006.01) |
| *A47B 51/00* | (2006.01) |
| *H02G 15/02* | (2006.01) |

(52) U.S. Cl.
CPC ........... *H02G 15/06* (2013.01); *A47B 46/005* (2013.01); *A47B 47/0091* (2013.01); *A47B 51/00* (2013.01); *H02G 15/025* (2013.01); *A47B 2051/005* (2013.01)

(58) Field of Classification Search
USPC ............................................ 174/61; 248/343
See application file for complete search history.

(56) References Cited

U.S. PATENT DOCUMENTS

| | | | | | |
|---|---|---|---|---|---|
| 3,142,447 | A | * | 7/1964 | Bodian | F21V 17/162 248/343 |
| 3,378,221 | A | * | 4/1968 | Wolar | F21V 21/02 248/343 |
| 5,799,909 | A | * | 9/1998 | Ziegler | B65F 1/1415 220/481 |
| 7,148,420 | B1 | * | 12/2006 | Johnson | H02G 3/125 174/50 |
| 9,502,810 | B2 | * | 11/2016 | DeCosta | H02G 1/00 |

* cited by examiner

*Primary Examiner* — Dhirubhai R Patel
(74) *Attorney, Agent, or Firm* — Florek & Endres PLLC (57) ABSTRACT

A recessed, deployable ceiling box assembly includes a ceiling frame-mounting member and a ceiling box member, a support member for securing the ceiling frame-mounting member to a ceiling structural member and one or more connector members for attaching the ceiling box member to the ceiling frame-mounting member. The ceiling box member is deployable from a retracted position, where the ceiling box member is retained within the ceiling frame-mounting member at or above the height of the ceiling, to a deployed position, where the ceiling box member hangs by the connector member below the height of the ceiling. A door may be used to cover the contents of the deployable ceiling box assembly.

20 Claims, 9 Drawing Sheets

DEPLOYABLE CEILING BOX ASSEMBLY

FIELD OF THE INVENTION

The present invention relates to the field of construction installation and infrastructure boxes for audio/video and datacom cable, wire, jack and outlet management.

BACKGROUND OF THE INVENTION

Room space has increasingly become an expensive and limiting factor when setting up and installing audio/visual equipment, computer networking, interface boxes, distribution amplifiers, matrix switches, and the like. In order to solve space limitations, equipment boxes, shelves, carts, floor-standing and wall-mounted rack units, projector poles and outlet power strips are typically utilized. These attempts to solve such space limitations, however, can take up already scarce floor or wall space.

Moreover, cables, jacks and electrical outlets that are used to power audio/visual equipment can create unsightly, cluttered and even dangerous conditions with randomly placed wires causing personal hazards. The risk of hazards is especially high in rooms that receive heavy foot traffic such as might occur, e.g., in conference centers, schools, general meeting facilities, training facilities, airports, medical facilities, museums, retail environments, lunch rooms, huddle spaces, corporate offices and sports bars and restaurants. The use of cable protection cord covers might provide some visual cue of wires running along a floor, but they can create a bump on the floor and are also unsightly. These attempts to remedy space limitations may ruin the architect's design of the room.

A potentially overlooked area for space savings and visually hiding cables and electrical wires and equipment, such as audio/visual equipment, computer networking, interface boxes, distribution amplifiers, matrix switches, and the like, is within the ceiling space of the room. However, using ceiling mounted boxes have the inherent difficulty of making connections that are not within the box itself, since there is generally no access to the space above the box.

It is, therefore, an object of the present invention to provide ceiling boxes to use ceiling space for cables, wires, jacks, outlets and the like, without impacting limited floor or wall space.

The ceiling space above the room may be used to install boxes that keep the audio/visual equipment, computer networking, interface connections, distribution amplifiers, matrix switches, and the like separate from the wall and floor room space. Moreover, keeping these sensitive components out of everyday reach can prevent tampering or inadvertent and accidental breakage of equipment or disconnection of critical wiring. Freeing up floor and wall space with the recessed, deployable ceiling structures of the present invention also helps to remove the dangerous tripping hazards from wires laying on the floor.

It is a further object of the present invention to provide ceiling boxes that comprise ceiling frame-mounted assemblies that can receive ceiling box products that are suitable for insertion into the ceiling frame-mounted assemblies. The ceiling box products allow, e.g., installation of a plurality of rack shelving for mounting of rack equipment, and AC receptacles to accommodate electrical requirements of audio visual equipment, computer networking, interface boxes, distribution amplifiers, matrix switches, and the like. Thus, using the recessed, deployable ceiling structures of the present invention helps reduce the use of valuable room floor and/or wall space by utilizing space typically ignored when organizing infrastructures.

A further advantage of the present invention is that the ceiling boxes allow for the suspension of the ceiling box products from the ceiling frame-mounted assemblies by wire cables to enable servicing of the ceiling box product components and connections without having to completely take down and remove the ceiling box products from the ceiling frame-mounted assemblies.

SUMMARY OF THE INVENTION

These and other objects are achieved by the present invention, which is directed to a recessed, deployable ceiling box assembly comprising a ceiling frame-mounting member and a cooperating ceiling box member suitable for being accepted in the ceiling frame-mounting member. The components of the recessed, deployable ceiling box assembly are preferably constructed of metal, but any suitable material for the construction trade can be used.

The ceiling frame-mounting member is preferably a four-sided structure with an open top and bottom. The bottom edge of the ceiling frame-mounting member preferably comprises a flange or lip that extends outwardly from at least a portion of the bottom edge of, and preferably surrounds the entire perimeter of the ceiling frame-mounting member. One or more, and preferably each, of the sides of the ceiling frame-mounting member may have cut-outs for lessening the weight of the ceiling frame-mounting member and to improve visibility into the area above the ceiling material and around the ceiling frame-mounting member for facilitating cabling to the ceiling box assembly.

The ceiling frame-mounting member is preferably secured within the space above the ceiling drywall by using a support member, such as a threaded rod, rod, wire, cable, screws, nails or the like and combinations thereof, or other means acceptable and appropriate in the construction industry. By way of example, and not to limit the scope of the invention, the preferred support member is a threaded rod, rod, cable, wire or the like which is preferably affixed to an L-shaped bracket or the like on the ceiling frame-mounting member.

In such an embodiment, one side of the L-shaped bracket is fixed to the ceiling frame-mounting member at each corner, such that the upper portion of the L-shaped bracket is parallel to the ceiling surface. A portion of the support member is then placed through the aperture, preferably in the form of a slot, on the upper portion of the L-shaped bracket to secure the support member to the ceiling frame-mounting member. The other end of the support member can be affixed to an I-beam, ceiling joist or other appropriate support structure in the ceiling using any fastening or securing means. For example, if the ceiling has wooden joists or installation requires the use of wood materials during placement of the ceiling frame-mounting member, the use of screws can securely affix the support member secured to the ceiling frame-mounting member.

When installation of the ceiling frame-mounted member is complete, the bottom edge lip of the ceiling frame-mounting member presses flush against the finished ceiling. Of course, additional fastening members can be used to secure the lip to the ceiling, including screws, nails, clamps, clips, and the like, or combinations thereof.

Once the ceiling frame-mounting member is secured at the ceiling, the ceiling box member is prepared for installation within the ceiling frame-mounting member. The ceiling box member is designed to fit inside the ceiling frame-mounting member. Thus, the ceiling frame-mounting member acts as a sleeve to accept the insertion of the ceiling box member. The ceiling box member is preferably attached to the ceiling frame-mounting member by connectors such as cables, springs, wire and the like, preferably wire connectors that tether the ceiling box member to the ceiling frame-mounting member. The connectors are attached at one end to the ceiling box member and at the other end to the ceiling frame-mounting member, at any suitable locations on the ceiling box member and the ceiling frame-mounting member, such that the ceiling box member is tethered to the ceiling frame-mounting member.

Fastening the connectors in this fashion permits the ceiling box member to deploy and hang vertically suspended from the ceiling frame-mounting member while, for example, appropriate audio/visual equipment and rack shelving are installed, electrical connections are made within the ceiling box member and/or servicing of ceiling box member components is performed. Thereafter, the ceiling box member is pushed up into the ceiling frame-mounting member and is preferably locked in place with retention elements such as clevis pins. By such installation, the ceiling box member is fixed above the plane of the ceiling and recessed from the room space.

After the ceiling box member is pushed into place, a removable cover door preferably covers the ceiling box member and/or frame-mounting assembly to shield the internal components from view. In a preferred embodiment, the cover door is composed of plastic, light gauge metal or similar material that is removably or permanently attached to the ceiling frame-mounting member or the ceiling box member, most preferably with a hinge, that fits over the ceiling frame-mounting member opening. Another embodiment comprises a frame preferably designed to removably attach to the ceiling frame-mounting member or the ceiling box member comprising an interior lip or flange for retaining an insert of fitted material such as a section of drywall, ceiling tile, plastic or like material. The insert is preferably secured within the frame by means of bendable tabs, glue or other like means to affix the insert to the interior lip or flange.

To prevent the cover door from dropping when opened, it preferably has door connectors attached between it and the interior of the ceiling box member in the form of a hinge or other connection member. The door safety connectors can be a hinge, rod, cable, cord, stranded wire cable or the like. In a preferred embodiment, the door safety connectors have eyelets at each end to allow one end to affix to the removable cover door and the opposing end to affix to the ceiling frame-mounting member or the ceiling box member. When the removable door is closed, it is preferably secured in place by means of fasteners such as screws, clips, snaps, latches, tabs, or the like.

In an alternative embodiment, the cover door is hinged to the ceiling frame-mounting member and closed by means of fasteners that are at the opposite side of the hinge. Preferable fasteners for securing the cover door in the closed configuration can be screws, latches, tabs, clips, snaps and the like, and preferably screws.

In another embodiment, the cover door contains tabs on opposing sides that allow it to slide into tracking located on the sides of the ceiling frame-mounting member and/or the ceiling box member. Once the tabs are engaged with the tracking, the cover door is able to pivot so that upon opening the free edge faces downward, i.e., perpendicular to the ceiling. Upon closing, the cover door is slid on the tracking to one end of the ceiling box member, pivoted upward and secured by means of securing fasteners. Preferable securing fasteners for securing the cover door can be screws, latches, tabs, clips, snaps and the like, preferably screws.

BRIEF DESCRIPTION OF THE DRAWINGS

The present invention is better understood when considered in view of the attached drawings, in which like reference characters indicate like parts. The drawings, however, are presented merely to illustrate the preferred embodiments of the invention without limiting the invention in any manner whatsoever.

DETAILED DESCRIPTION OF THE PREFERRED EMBODIMENT

Figure 1:
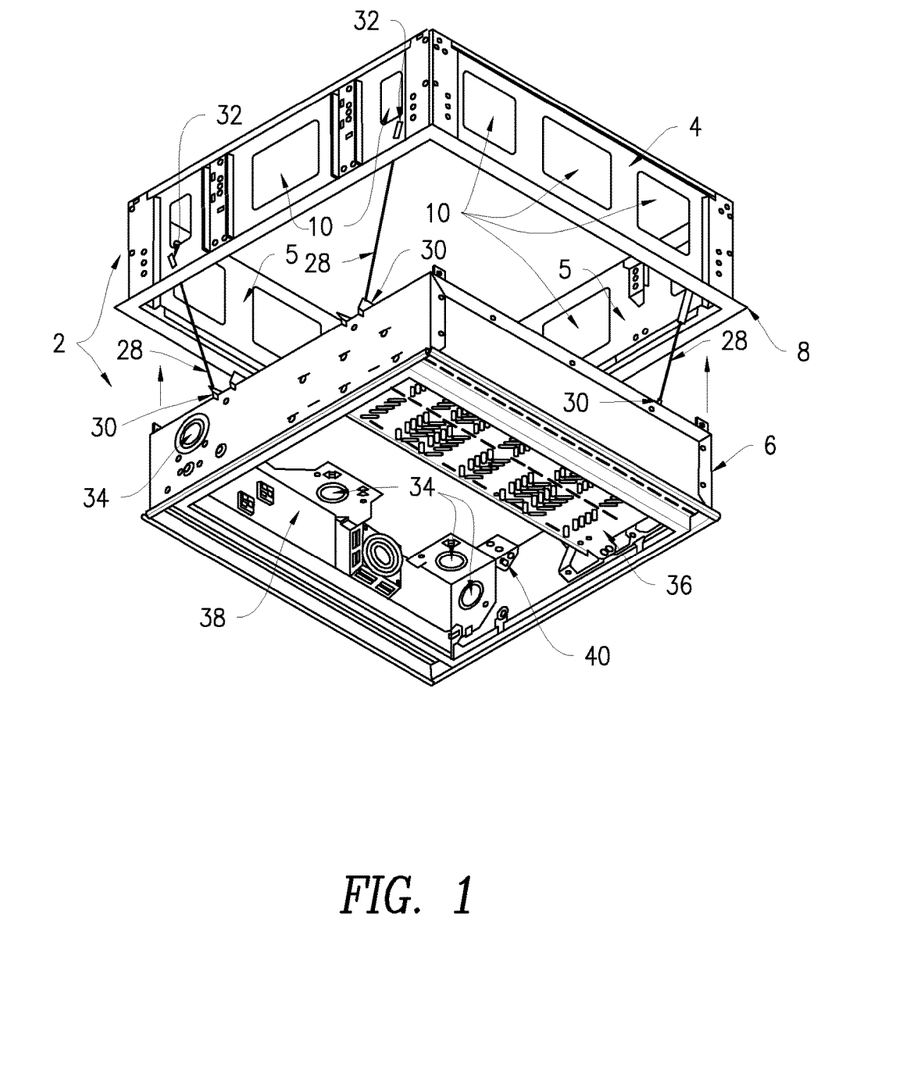
FIG. 1 is a perspective view of the deployable ceiling box assembly in its deployed configuration.

The present invention is directed to a recessed, deployable ceiling box assembly 2 comprising a ceiling frame-mounting member 4 and a ceiling box member 6. As best shown in FIG. 1, the ceiling frame-mounting member 4 is preferably a four-sided structure with an open top and bottom. The bottom of the ceiling frame-mounting member 4 comprises a lip 8 extending outwardly from the perimeter of the ceiling frame-mounting member 4. The ceiling frame-mounting member 4 may have cut-outs 10 on the sides that reduces the weight of the ceiling frame-mounting member 4 and provides visibility into the area above the ceiling material 12 and around the ceiling frame-mounting member 4 for facilitating wiring of the ceiling box member 6 once the ceiling box member 6 is installed into the ceiling frame-mounting member 4, as shown in FIG. 1. The components of the recessed, deployable ceiling box assembly 2 are preferably constructed of metal, but any suitable material for the construction trade can be used.

Figure 4:
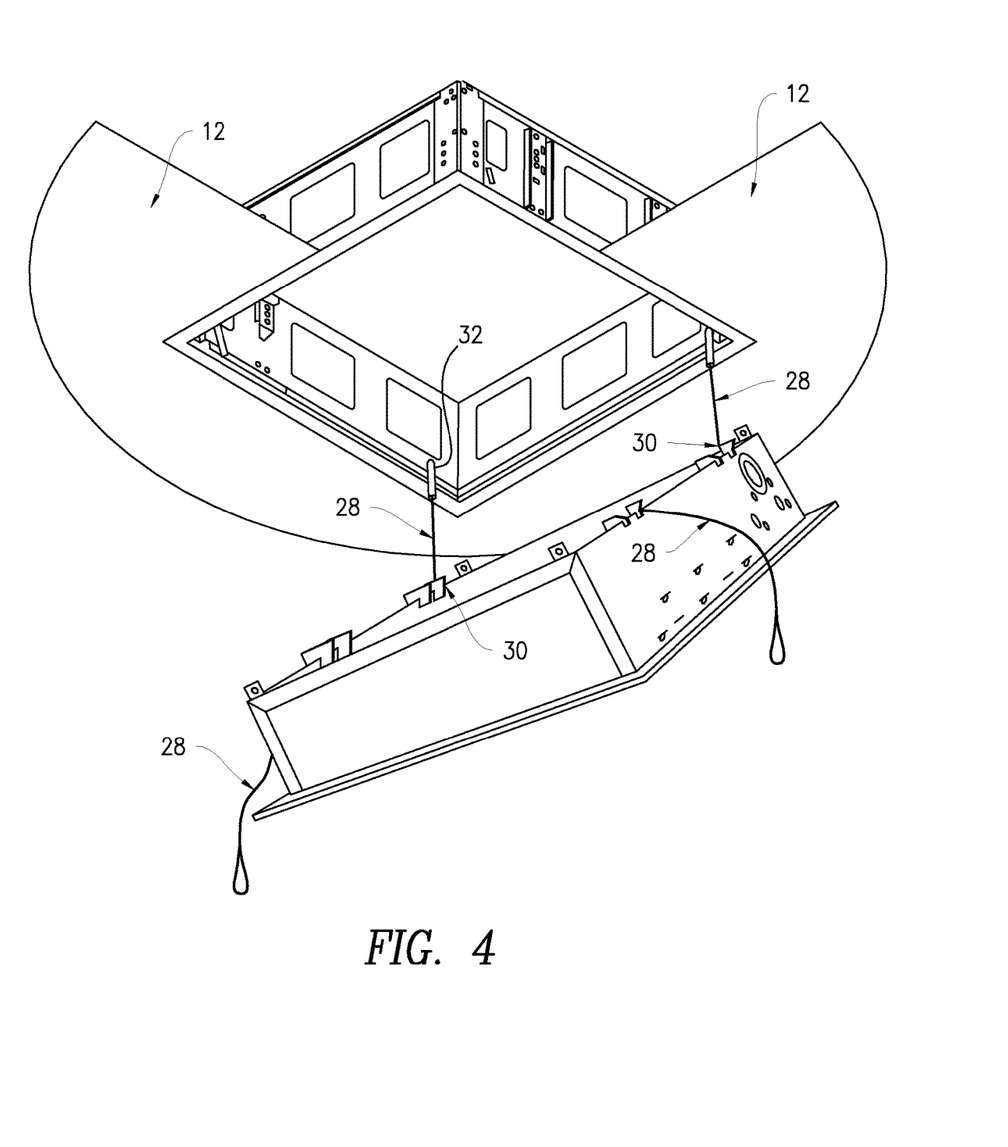
FIG. 4 is a partial cut-away perspective view of the ceiling frame-mounting member flush-mounted against a ceiling.

The ceiling frame-mounting member 4 of the deployable ceiling box assembly 2 is preferably secured within the space above the room ceiling material 12, which may be drywall, cement board, ceiling tile, etc., as shown in FIG. 4. The ceiling frame-mounting member 4 is secured to one or more ceiling structural members, i.e., joists, beams, surfaces or the like, by a support member 14, preferably comprising a threaded rod, rod, wire, cable, or the like and combinations thereof, or other support means known to one of skill in the construction installation art.

In "raw" spaces, i.e., areas unfinished and not "trimmed out," the ceiling frame-mounting member 4 is installed similar to other electrical boxes, such that the ceiling frame-mounting member 2 will be substantially flush with the finished ceiling material 12 once installed, as shown in FIG. 4. For already finished spaces, and by way of example, the ceiling material 12 may be opened by cutting to the dimensions of the ceiling frame-mounting member 4 within the lip 8. This permits the sleeve of the ceiling frame-mounting member 4 to fit within the opening created in the ceiling material 12, with the lip 8 extending over the edge of the ceiling material 12 adjacent the opening when the ceiling frame-mounting member 4 is inserted into the opening in the ceiling material 12.

Figure 5:
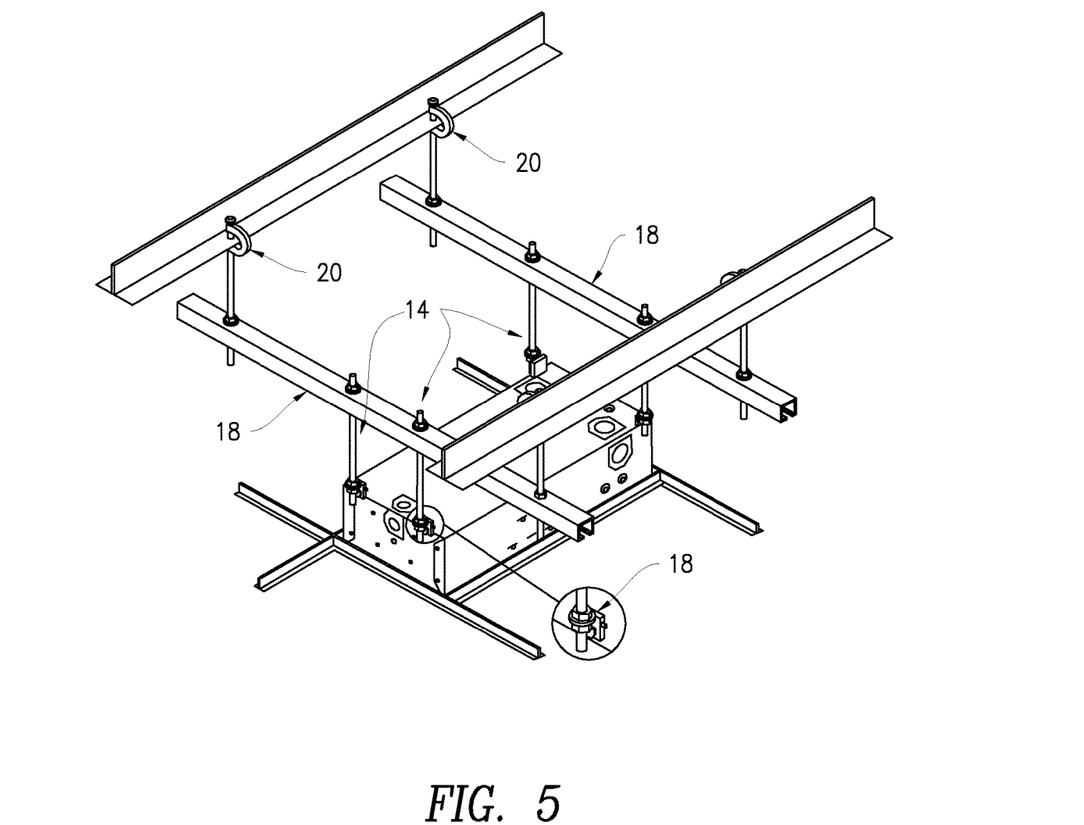
FIG. 5 is a perspective view of one embodiment of a support member for connecting the ceiling frame-mounted member to a ceiling structure.
Figure 6:
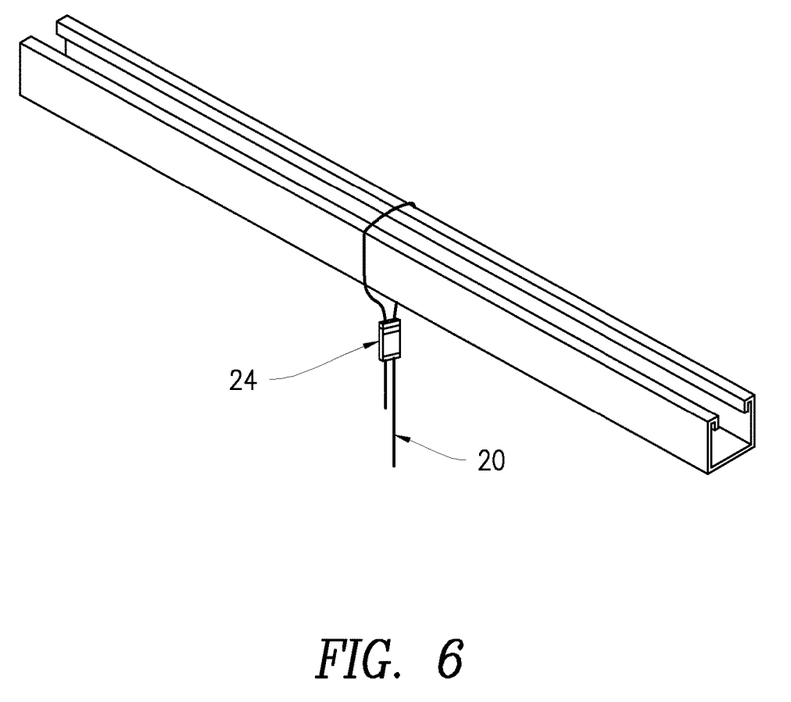
FIG. 6 is a partial perspective view of an alternative embodiment of a support member for connecting the ceiling frame-mounting member to a ceiling structure in the form of a quick adjust cable clamp.

By way of example, and in a preferred embodiment, one end of the support member 14 may be fixed to a ceiling structural member, by means of a fastener 20, such as a C-clamp as shown in FIG. 5 or a quick adjust cable clamp as shown in FIG. 6. The other end of the support member 14 is preferably affixed to a retention member 18 on the ceiling frame-mounting member 4, the retention member 18 being in the form of a tab, a hook, a hole, a bracket, or the like, and preferably, an L-shaped bracket on the ceiling frame-mounting member 4. As depicted in FIG. 5, one leg of the preferred L-shaped bracket retention member 18 is fixed to the ceiling frame-mounting member 4 while the opposing leg of the L-shaped bracket 4 is parallel to the ceiling. The support member 14, preferably in the form of a threaded rod, is inserted through a slot in the L-shaped bracket and then fixed at a particular height by using a nut on either side of the L-shaped bracket.

Figure 7:
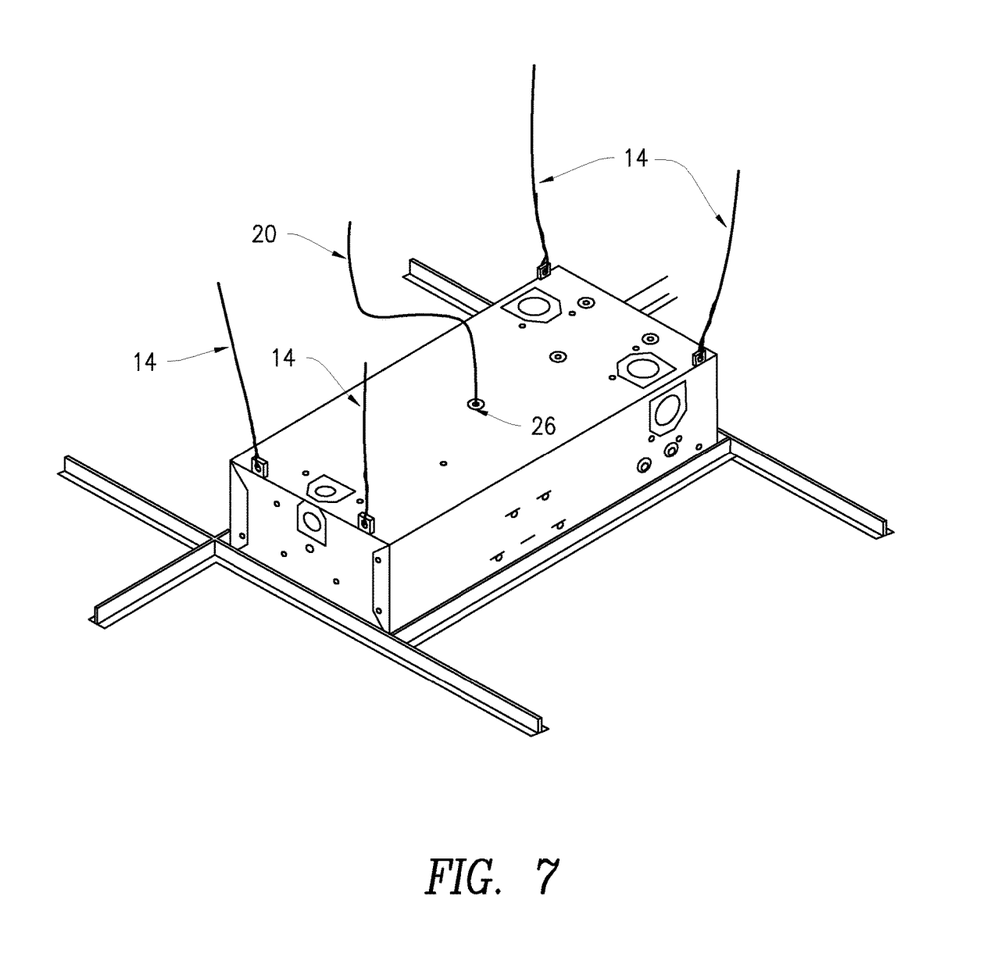
FIG. 7 is a perspective view of an embodiment of a support member for securing the ceiling frame-mounting member to a ceiling structure.

Alternatively, the support member 14 can be a wire that passes through an opening in the retention member 18, looped back and twisted around itself to secure the ceiling frame-mounting member 4. FIG. 7 depicts such a cable looped back through the retention member 8 and twisted around itself to secure the ceiling frame-mounting member 4.

In a further embodiment, the ceiling frame-mounting member 4 can be secured to ceiling structural members, i.e., wood joists, cement surfaces, etc., such that the lip 8 of the ceiling frame-mounting member 4 is flush with the finished ceiling once the ceiling material 12 is installed. These examples are not intended to limit the means whereby one may secure the ceiling frame-mounting member 4 in a ceiling, and are amenable to use in combination with each other to securely affix the deployable ceiling box assembly 2 to the ceiling as one of skill in the construction installation art would know.

Figure 9:
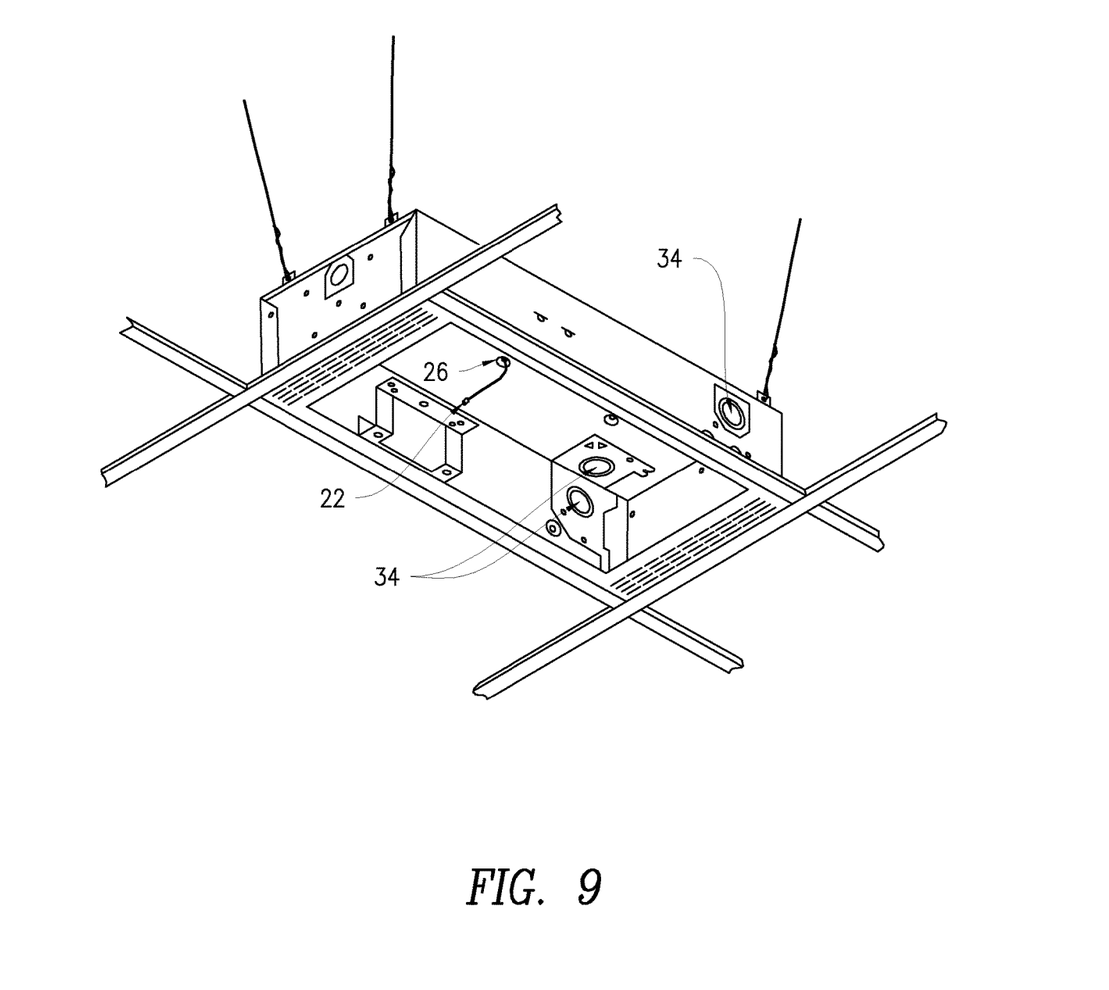
FIG. 9 is a perspective view of the ceiling frame-mounting member safety cable and safety cable stop.

Installation of the recessed, deployable ceiling box assembly 2 should preferably use appropriate mounting methods based on local building codes. Certain locales may have local building codes that require the installation of safety cable to secure such an installation. FIG. 9 depicts the ceiling box member safety cable 20 and safety cable stop 22. Where required, one end of the safety cable 20 is preferably attached to a structural member in the ceiling using a safety cable fastener 24, which can be any suitable fastener but is preferably a quick adjust cable clamp, to secure the cable to an acceptable ceiling structural member that can be used as an anchoring structure. FIG. 6 illustrates the use of a quick adjust cable clamp as a fastener 24 for use with a safety cable 20. The other end of the safety cable 20 is preferably passed through an aperture 26 in the upper surface of the ceiling box member 6 and/or the ceiling frame-mounting member 4 as seen in FIG. 7 and FIG. 9.

Once the ceiling frame-mounting member 4 is attached securely to the ceiling, it is possible to insert the ceiling box member 6 into the ceiling frame-mounting member 4. While not intending to limit the scope of the invention, preferred sizes of the ceiling box members of the present invention have dimensions of about 1 foot by about 2 feet and about 2 feet by about 2 feet. As is seen from FIGS. 1 and 2 the ceiling frame-mounting member 4 of the deployable ceiling box assembly 2 is preferably of slightly larger dimension than the ceiling box member 6 to enable insertion of the ceiling box member 6 into the ceiling frame-mounting member 4. Thus, the ceiling frame-mounting member 4 acts as a sleeve to accept the insertion of a ceiling box member 6 that is of appropriate size for the ceiling frame-mounting member 4.

Figure 2:
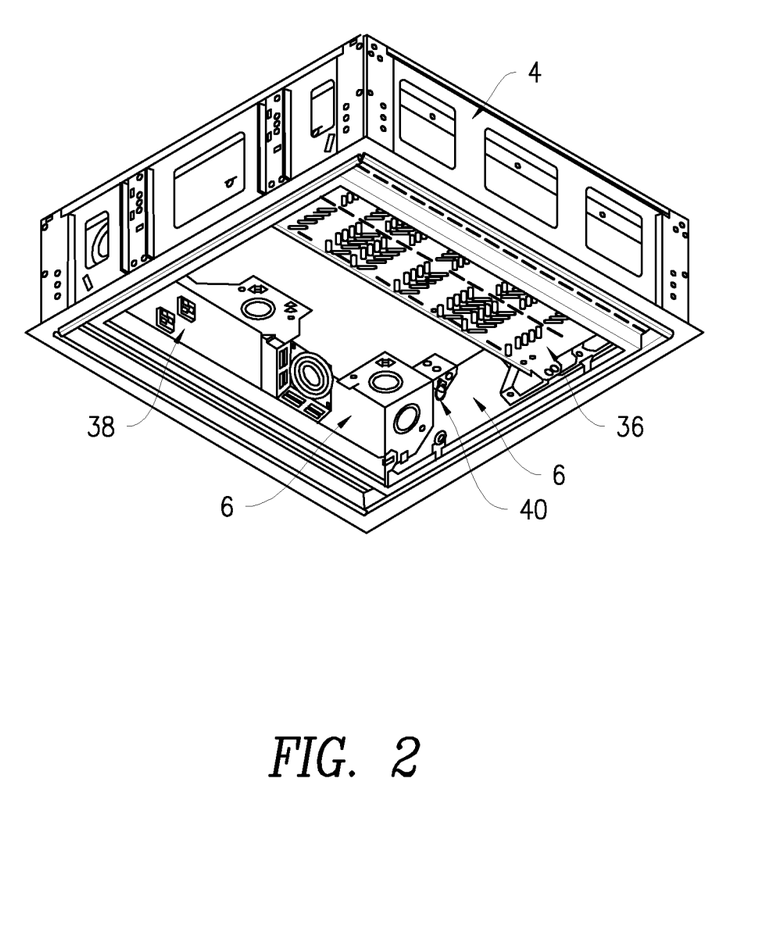
FIG. 2 is a perspective view of the deployable ceiling box assembly of FIG. 1 in its closed configuration.
Figure 3:
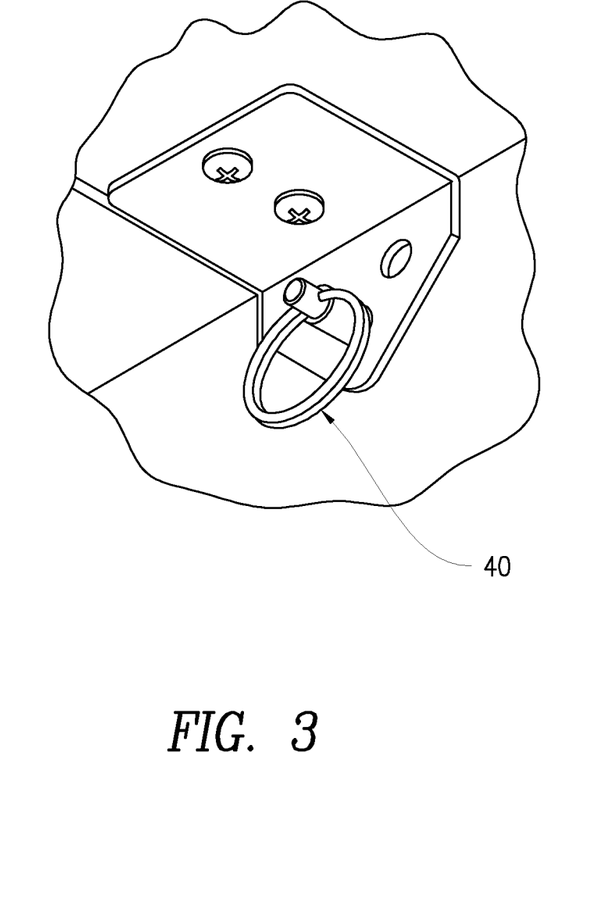
FIG. 3 is a partial perspective view of the retention member in the form of a clevis pin used to retain the ceiling box member securely inside the ceiling frame-mounting member.

FIG. 2 shows the ceiling box member 6 fitted inside the ceiling frame-mounting member 4. The ceiling box member 6 is preferably secured to the ceiling frame-mounting member 4 by a plurality of connector members 28, which can be selected from any suitable connectors, such as but not limited to cables, springs, wire and the like, and preferably cable connectors. In a preferred embodiment, connector members 28 attach to mounting tabs 30 located near each corner on either side of the ceiling box member 6. The other ends of the connector members 28 are preferably connected to the sides of the ceiling frame-mounting member 4, preferably using fasteners fitted into pre-formed holes 32 in that correspond to the appropriate mounting tabs 30 on the ceiling frame-mounting member 4. Attaching and fastening the connector members 28 in this fashion permits the ceiling box member 6 to deploy and hang vertically from the ceiling frame-mounting member 4, i.e., substantially parallel to the ceiling material 12, as depicted in FIG. 1.

As shown also shown in FIG. 1, the ceiling box member 6 preferably has a plurality of knock-outs 34 on one or more surfaces that allow for the passage of electrical wires and cables into the ceiling box member 6 as required for the particular application. The knock-outs 34 can preferably accommodate the appropriate connectors for wiring and/or cables, e.g., electrical conduit, Romex, Greenfield Flexible Conduit, BX cable, coaxial, and the like, as one in the construction, electrical and/or audio/visual art would know.

When the ceiling box member 6 is deployed from the ceiling frame-mounting member 4, preferably hanging from the ceiling frame-mounting member 4 by the connector members, it allows convenient access to the components of the ceiling box member 6. This novel aspect of the recessed, deployable ceiling assembly 2 enables the performance of work on the internal components of the ceiling box member 6, which may include placement of racks and/or hook-ups and connections for audio/visual equipment, computer networking, interface boxes, distribution amplifiers, matrix switches, and the like, while the ceiling box member 6 preferably remains attached to the ceiling frame-mounting member 4. Thus, there is no need to entirely remove the ceiling box member 6 from the ceiling frame-mounting member 4 when performing such tasks, making deployment and re-installation easier.

In one embodiment, pre-formed, threaded holes in the interior of the ceiling box member 6 allow, for example, audio/visual equipment and/or rack shelving installation 36 and/or installation of electrical receptacle packs 38 as desired for end use. FIGS. 1 and 2 show perspective views of this embodiment. The preferably deployable nature of the ceiling box member 6 enables the installation and/or servicing of these internal components of the ceiling box member 6 without completely removing and/or detaching the ceiling box member 6 from the ceiling frame-mounting member 4.

Once the ceiling box member 6 is secured to the ceiling frame-mounting member 4 and the desired components are added and appropriately connected, the ceiling box member 6 is preferably pushed up into the ceiling frame-mounting member 4. The ceiling box member is then locked in place to the ceiling frame-mounting member 4 by one or more locking members 40, including fasteners, stops, clips, snaps, pins, clasps, latches, straps, or the like, and preferably with clevis pins.

In a preferred embodiment, the deployable ceiling box assembly 2 further comprises a cover or door 42 to cover the ceiling frame-mounting member 4 and/or ceiling box member 6, to shield the internal components from view. Preferably, the door 42 is composed of plastic, light gauge metal or similar material designed to fit over the deployable ceiling box assembly 2. When placed over the assembly 2, the door 42 preferably affixes to one or more of the ceiling frame-mounting member 4 and the ceiling box member 6 by means of a fastener, including but not limited to latches, clips, pins, clasps, screws, tabs, snaps, and the like.

Figure 8:
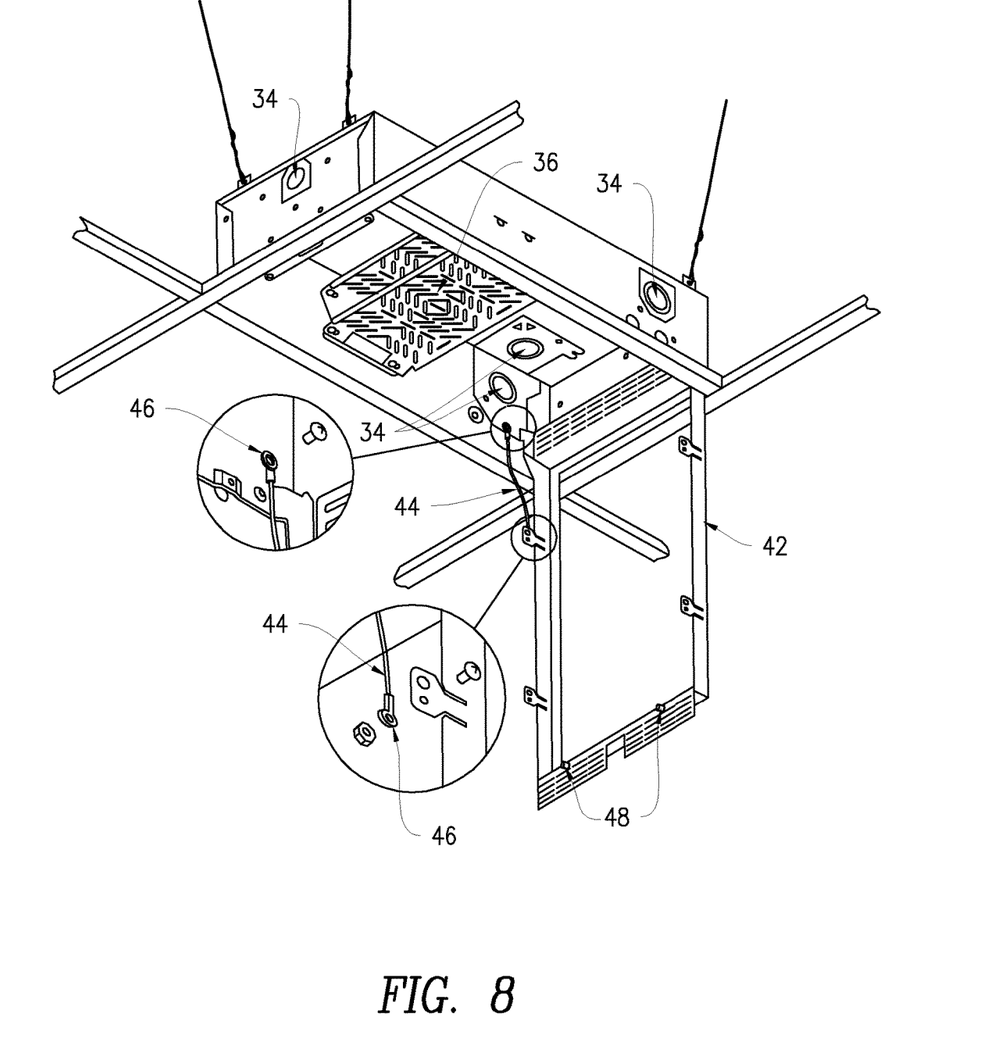
FIG. 8 is a perspective view of an embodiment of a cover door as part of the deployable ceiling box assembly.

In one embodiment, the door 42 comprises a frame for receiving a portion of the ceiling material 12 or other substrate to fit over the deployable ceiling box assembly 2 and blend into the adjacent ceiling. FIG. 8 provides a perspective view of a preferred embodiment of a door 42 that comprises an interior frame, lip, flange, surface or the like that receives and supports an insert of fitted material such as a section of drywall, ceiling tile, plastic or like ceiling material. The insert is preferably secured within the door 42 by means of bendable tabs, glue or other like means that will affix the insert to the door 42.

To prevent the door 42 from dropping when opened, it preferably has one or more door safety connectors 44 attached between the door 42 and the interior of the ceiling box member 6. The door safety connector 44 can be a rod, a cable, a cord, a wire, or the like that will support the door 42 in the open position. In a preferred embodiment, the door safety connector 44 has attachment elements 46, shown as eyelets, at each end to allow one end to be attached to the door 42 and the opposing end to be attached to the interior of the ceiling box member 6. Preferably a fastener, such as a pan head screw, rivet, bolt or the like cooperates with a matching pre-formed hole on the ceiling box member 6 to secure the door connector 44 to the ceiling box member 6.

When the door 42 is closed, it is preferably secured in place by means of a securing element 48 to ensure that it does not unintentionally open. The securing element 48 can be any suitable element that can hold the door 42 in a closed orientation but can be manipulated to allow the door 42 to move to an open orientation. Examples include, but are not limited to clips, snaps, screws, catches, latches, fasteners, pins, tabs, and the like, and may be lockable to prevent unauthorized access.

In a preferred embodiment, the door 42 is hinged to the ceiling frame-mounting member 4 at one side and secured in the closed orientation by means of one or more securing elements 48 at the opposite side of the hinge.

Variations, modifications and alterations to the above detailed description will be apparent to those skilled in the art. All such variations, modifications and/or alternatives are intended to fall within the scope of the present invention, limited only by the claims. All cited patents and publications are hereby incorporated in their entirety by reference.

I claim:

1. A recessed, deployable ceiling box assembly comprising:
   a ceiling frame-mounting member comprising one or more side walls forming a sleeve having an open top and an open bottom for defining an opening in a ceiling material and a lip extending from the one or more side walls for resting against a finished ceiling surface;
   a support member for supporting the ceiling frame mounting member within the ceiling;
   a ceiling box member comprising an interior portion for housing one or more internal components connected to external sources through one or more passages in the ceiling box member, wherein the ceiling box member fits within and is received by the sleeve of the ceiling frame-mounting member and is adaptable from a retracted position within the sleeve of the ceiling frame-mounting member to a deployed position outside the ceiling frame-mounting member;
   a connector member coupling the ceiling frame-mounting member and the ceiling box member, to maintain the ceiling box member in fixed relation to the ceiling frame-mounting member when in the deployed position, and
   a locking member for securing the ceiling box member to the ceiling frame-mounting member in the retracted position.

2. The assembly of claim 1 wherein at least a portion of the ceiling frame-mounting member is constructed of metal.

3. The assembly of claim 1 wherein at least a portion of the ceiling box member is constructed of metal.

4. The assembly of claim 1 wherein the lip of the ceiling frame-mounting member extends outward from a perimeter of the sleeve.

5. The assembly of claim 1 wherein the sleeve of the ceiling frame-mounting member comprises one or more cut-outs.

6. The assembly of claim 5 wherein the sleeve comprises cut-outs on each side of the ceiling frame-mounting member.

7. The assembly of claim 1 wherein the support member is taken from the group consisting of one or more of a threaded rod, a rod, a wire, a cable, a fastener, a screw, a nail, a clip, a latch, a snap, a clasp, a strap, a clamp, and combinations thereof.

8. The assembly of claim 1 wherein the ceiling box member is deployed vertically from the ceiling frame-mounting assembly.

9. The assembly of claim 1 wherein the connector member is taken from the group consisting of a wire, a cable, a spring, a chain, a rod, and combinations thereof.

10. The assembly of claim 1 further comprising a door for covering the ceiling box member.

11. The assembly of claim 10 wherein the door comprises a hinge.

12. The assembly of claim 10 wherein the door comprises a frame for receiving a section of the ceiling material.

13. The assembly of claim 10 wherein the door further comprises a connector for coupling the door to one or more of the ceiling frame-mounting member and the ceiling box member.

14. The assembly of claim 1 further comprising a securing element for holding the door in the closed position.

15. The assembly of claim 1 wherein the one or more internal components of the ceiling box member comprises one or more mounting elements for mounting rack shelving on the interior portion of said ceiling box member.

16. The assembly of claim 1 wherein the one or more internal components of the ceiling box member comprises one or more rack shelves in the interior portion of said ceiling box member.

17. The assembly of claim 1 wherein the one or more internal components of said ceiling box member comprises one or more of an alternating current ("AC") receptacle, an Ethernet port, a universal serial bus ("USB") port, a high definition multimedia interface ("HDMI") port, a video port, a coaxial connection, and combinations thereof.

18. The assembly of claim 1 wherein the ceiling box member comprises one or more knockouts for the passage of wire and/or cable.

19. The assembly of claim 1 wherein the ceiling box member has width and length dimensions of from about 6 inches to about 2 feet.

20. The assembly of claim 1 wherein said locking member is taken from the group consisting of one or more fasteners, stops, clips, snaps, pins, clasps, latches, straps, clevis pins, and combinations thereof.

* * * * *